(12) United States Patent
Wang (10) Patent No.: US 10,499,311 B2
(45) Date of Patent: Dec. 3, 2019

(54) METHOD AND APPARATUS FOR IMPLEMENTING NETWORK SHARING

(71) Applicant: Alibaba Group Holding Limited, Grand Cayman (KY)

(72) Inventor: Qiang Wang, Zhejiang (CN)

(73) Assignee: Alibaba Group Holding Limited, Cayman Islands (KY)

( * ) Notice: Subject to any disclaimer, the term of this patent is extended or adjusted under 35 U.S.C. 154(b) by 95 days.

(21) Appl. No.: 15/645,902

(22) Filed: Jul. 10, 2017

(65) Prior Publication Data

US 2017/0311224 A1 Oct. 26, 2017

Related U.S. Application Data

(63) Continuation of application No. PCT/CN2016/071549, filed on Jan. 21, 2016.

(30) Foreign Application Priority Data

Jan. 30, 2015 (CN) .......................... 2015 1 0050899

(51) Int. Cl.
*H04L 12/741* (2013.01)
*H04W 76/10* (2018.01)
(Continued)

(52) U.S. Cl.
CPC .............. *H04W 40/24* (2013.01); *G06F 8/61* (2013.01); *H04L 12/4633* (2013.01);
(Continued)

(58) Field of Classification Search
CPC . H04L 61/256; H04L 29/249; H04L 61/2528; H04L 29/2405; H04W 76/10; H04W 92/10
See application file for complete search history.

(56) References Cited

U.S. PATENT DOCUMENTS

| 2006/0029028 | A1  | 2/2006 | Kim |
| 2008/0113674 | A1* | 5/2008 | Baig ...................... G06Q 10/10 455/456.3 |
| 2013/0128875 | A1* | 5/2013 | Kubota ................. H04W 36/08 370/338 |

FOREIGN PATENT DOCUMENTS

| CN | 201039395   | 3/2008 |
| CN | 101511132 A | 8/2009 |

(Continued)

OTHER PUBLICATIONS

Doyle et al., Routing TCP/IP (CCIE Professional Development), Apr. 11, 2001, Cisco Press, vol. II, 1st edition, 1068 pages. (Year: 2001).*

(Continued)

*Primary Examiner* — Hoon J Chung
(74) *Attorney, Agent, or Firm* — Lee & Hayes, P.C.

(57) ABSTRACT

A wireless network adapter is connected to a computing device. A driver module of the wireless network adapter converts a wireless-protocol data packet received through the wireless network adapter into an Ethernet-protocol data packet. A network address translation (NAT) module determines a Socket associated with a source address and a destination address of the Ethernet-protocol data packet, and sends valid data of the Ethernet-protocol data packet through the Socket. Additionally or alternatively, the NAT module encapsulates data into the Ethernet-protocol data packet after receiving the data through the Socket, and the driver module converts the Ethernet-protocol data packet into the wireless-protocol data packet, and sends the wireless-protocol data packet through the wireless network adapter. The present disclosure can implement functions of a device hotspot and is not limited by an operating system framework.

17 Claims, 5 Drawing Sheets

(51) Int. Cl.
    *H04W 40/24* (2009.01)
    *H04L 29/12* (2006.01)
    *H04L 29/08* (2006.01)
    *H04L 29/06* (2006.01)
    *G06F 8/61* (2018.01)
    *H04L 12/46* (2006.01)
    *H04L 12/721* (2013.01)
    *H04W 84/12* (2009.01)

(52) U.S. Cl.
    CPC .............. *H04L 29/08* (2013.01); *H04L 45/66* (2013.01); *H04L 45/74* (2013.01); *H04L 61/2007* (2013.01); *H04L 61/256* (2013.01); *H04L 61/2514* (2013.01); *H04L 61/2517* (2013.01); *H04L 61/2525* (2013.01); *H04L 61/2528* (2013.01); *H04L 69/08* (2013.01); *H04W 76/10* (2018.02); *H04W 84/12* (2013.01)

(56) References Cited

FOREIGN PATENT DOCUMENTS

| CN | 101562864 | 10/2009 |
| CN | 102880508 A | 1/2013 |
| CN | 202841409 | 3/2013 |
| JP | 2004310757 JP | 11/2004 |
| JP | 2011004271 JP | 1/2011 |

OTHER PUBLICATIONS

Translation of International Search Report from corresponding PCT application No. PCT/CN2016/071549 dated Apr. 12, 2016, 2 pages.
Translation of Written Opinion from corresponding PCT application No. PCT/CN2016/071549 dated Apr. 12, 2016, 6 pages.
PCT International Preliminary Report on Patentability dated Aug. 1, 2017 for PCT Application No. PCT/CN2016/071549, 5 pages.
Chinese Office Action dated Jul. 30, 2018 for Chinese Applicatin No. 201510050899.2, a counterpart foreign apllication of U.S. Appl. No. 15/645,902, 7 pages.
Chinese Search Report dated Jul. 16, 2018 for CN Application No. 201510050899.2, 2 pages.
Japanese Office Action dated Sep. 24, 2019 for Japanese Patent Application No. 2017-540199, a counterpart of U.S. Appl. No. 15/645,902, 6 pages.

* cited by examiner

METHOD AND APPARATUS FOR IMPLEMENTING NETWORK SHARING

CROSS REFERENCE TO RELATED PATENT APPLICATIONS

This application claims priority to and is a continuation of PCT Patent Application No. PCT/CN2016/071549 filed on 21 Jan. 2016, and is related to and claims priority to Chinese Patent Application No. 201510050899.2, filed on 30 Jan. 2015, entitled "Method and Apparatus for Implementing Network Sharing," which is hereby incorporated by reference in its entirety.

TECHNICAL FIELD

The present disclosure relates to the technical field of network communications, and in particular, to methods and apparatuses for implementing network sharing.

BACKGROUND

Figure 1:
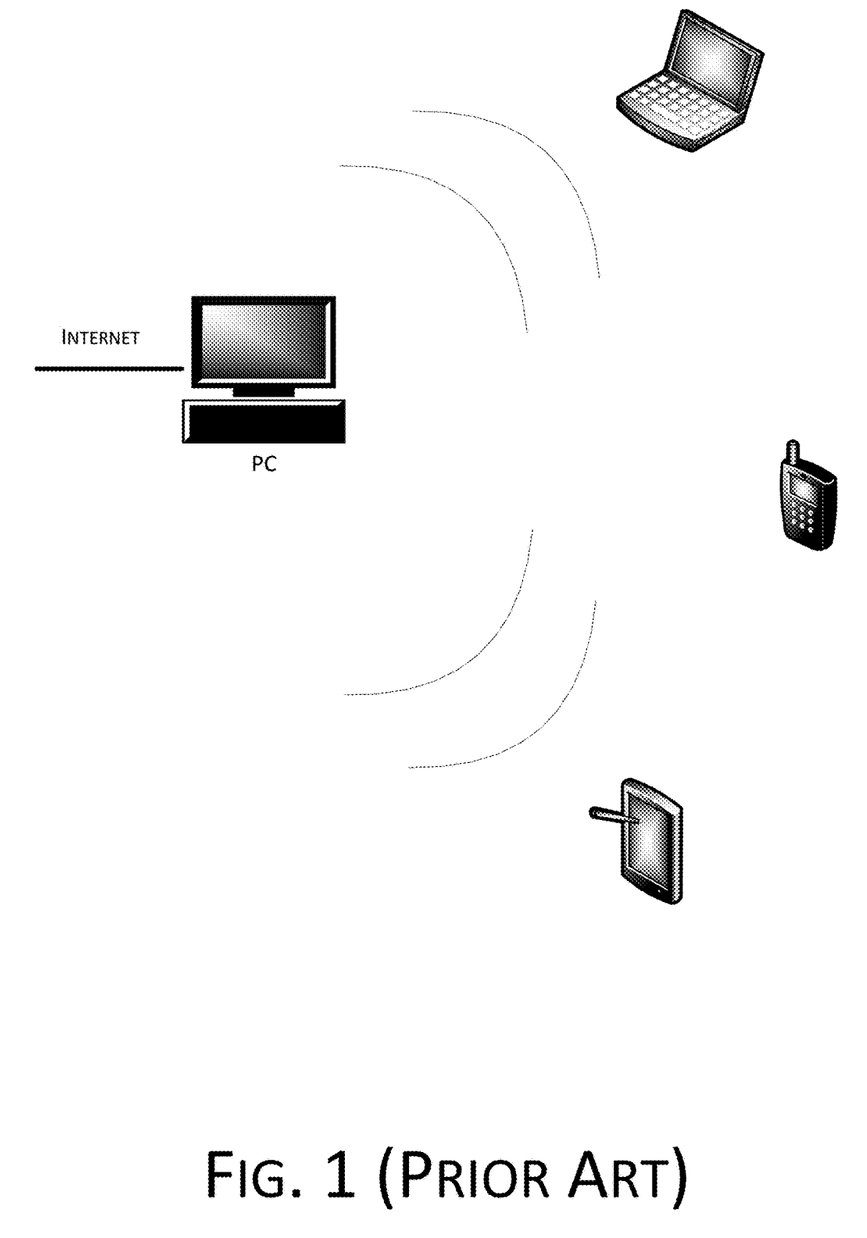
FIG. 1 is a schematic diagram of a device hotspot technology.

With the growing demand of intelligent mobile devices for wireless fidelity (wifi), a technology relating to using a personal computer (PC) to share a network with an intelligent mobile device, i.e., a PC hotspot technology, has quickly emerged. This PC hotspot technology is to use a computing device that is connected to a network as a hotspot, and shares a wifi signal with an intelligent mobile device. In this way, an intelligent mobile device such as a mobile phone, a tablet, or other notebooks, can be connected to the network through the computing device, achieving simultaneous connections to the network, as shown in FIG. 1.

Network Address Translation (NAT) is the core of stability and compatibility of a device hotspot. Primarily, two solutions of implementing a NAT of a PC hotspot exist for a Windows platform.

One solution involves the use of a built-in component of a Windows system: Internet Connection Sharing (ICS). However, since the ICS component is not a core component of the Windows system and largely relies on other services of the system, deficiencies such as a high failure rate, poor stability, and difficulty in locating a problem that occurs, etc., exist in practical uses.

To solve the foregoing deficiencies of the ICS, another solution has been proposed, which involves using a development of a Network Driver Interface Specification (NDIS) for performing network address translation. Being an intermediate layer in the Windows system, the NDIS, however, is limited by a Windows system framework, and needs a protocol driver of the Windows system when processing data packets. Therefore, during an installation of an NDIS driver, the protocol driver of the Windows system may consider that a network adapter has failed and disrupt a network connection, thus affecting use by a user. In addition, the NDIS driver has a low success rate of installation, and is difficult to be uninstalled. As a kernel mode driver, the NDIS may cause a blue screen which results in a computing device crash if a BUG occurs.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

The present disclosure provides a method and an apparatus for network sharing, to facilitate implementations of functions of a device hotspot and to remove limitations of an operating system framework. Details of technical solutions are given as follows.

The present disclosure provides a method for achieving network sharing, with a wireless network adapter being connected to a computing device. In the method, a driver module of the wireless network adapter may convert a wireless-protocol data packet that is received through the wireless network adapter into an Ethernet-protocol data packet, and a NAT module may determine a Socket associated with a source address and a destination address of the data packet, and send valid data of the data packet through the Socket. Additionally or alternatively, the NAT module may encapsulate data into the Ethernet-protocol data packet after receiving the data through the Socket, with the destination address and the source address of the data packet being a source address and a destination address associated with the Socket respectively, and the driver module may convert the data packet into the wireless-protocol data packet, and send the data packet through the wireless network adapter.

In implementations, the driver module may declare that the driver module is not a network adapter driver during installation.

In implementations, in the method, the driver module may further convert a wireless-protocol connection request received through the wireless network adapter into an Ethernet-protocol connection request. The NAT module may further create a Socket associated with a source address and a destination address of the connection request, the created Socket being used for establishing a network connection between the computing device and a device corresponding to the destination address of the connection request. The NAT module may encapsulate a connection response received through the Socket into an Ethernet-protocol connection response, wherein a destination address of the connection response is a source address associated with the Socket, and a source address of the connection response is a destination address associated with the Socket. The driver module may convert the connection response into a wireless-protocol connection response, and send the connection response through the wireless network adapter.

In implementations, sending the valid data of the data packet through the Socket includes sending the valid data of the data packet to a network protocol driver in the computing device through the Socket, to facilitate the network protocol driver in the computing device using information of the Socket to encapsulate the valid data and sending an encapsulated data packet through the network connection.

In implementations, in the method, the wireless network adapter may further establish a wireless network connection with an intelligent mobile terminal in advance, wherein the wireless-protocol data packet received through the wireless network adapter comes from the intelligent mobile terminal, and the wireless-protocol data packet sent through the wireless network adapter is sent to the intelligent mobile terminal.

In implementations, the NAT module may be deployed in the driver module or deployed in an upper-layer application.

The present disclosure further provides an apparatus for implementing network sharing. The apparatus may include a driver module of a wireless network adapter and a NAT module.

In implementations, the driver module may convert a wireless-protocol data packet received through the wireless network adapter into an Ethernet-protocol data packet, and provide the converted data packet to the NAT module, and the NAT module is configured to determine a Socket associated with a source address and a destination address of the data packet that is provided by the driver module, and send valid data of the data packet through the Socket.

Additionally or alternatively, the NAT module may encapsulate data into the Ethernet-protocol data packet, after receiving the data through the Socket, and provide an encapsulated data packet to the driver module, wherein the destination address of the data packet is a source address associated with the Socket, and the source address of the data packet is a destination address associated with the Socket, and the driver module is configured to convert the data packet provided by the NAT module into the wireless-protocol data packet and send the data packet through the wireless network adapter.

In implementations, during an installation when the wireless network adapter is connected to a computing device, the driver module may declare that the driver module is not a network adapter driver.

In implementations, the driver module may further convert a wireless-protocol connection request received through the wireless network adapter into an Ethernet-protocol connection request, provide the converted connection request to the NAT module, convert a connection response provided by the NAT module into a wireless-protocol connection response, and send the connection response through the wireless network adapter.

The NAT module may further create a Socket associated with a source address and a destination address of the connection request provided by the driver module, the created Socket being used for establishing a network connection between the computing device and a device corresponding to the destination address of the connection request, encapsulate a connection response received through the Socket into an Ethernet-protocol connection response, wherein a destination address of the connection response is a source address associated with the Socket, and a source address of the connection response is a destination address associated with the Socket, and provide the encapsulated connection response to the driver module.

In implementations, when sending the valid data of the data packet through the Socket, the driver module may send the valid data to a network protocol driver in the computing device, to facilitate the network protocol driver in the computing device using information of the Socket to encapsulate the valid data and sending an encapsulated data packet through the network connection.

In implementations, the driver module may further establish a wireless network connection between the wireless network adapter and an intelligent mobile terminal; receive the wireless-protocol data packet from the intelligent mobile terminal through the wireless network adapter, and send the wireless-protocol data packet to the intelligent mobile terminal through the wireless network adapter.

In implementations, the NAT module may be deployed in the driver module or deployed in an upper-layer application.

As can be seen from the above technical solutions, the present disclosure realizes a device hotspot by processing a data packet with a driver module of a wireless network adapter and a NAT module rather than an operating system, and therefore, the device hotspot is no longer limited by a framework of the operating system.

DETAILED DESCRIPTION

To make the objectives, technical solutions, and advantages of the present disclosure more clearly, the present disclosure is described in detail hereinafter with reference to accompanying drawings and specific embodiments.

Figure 2:
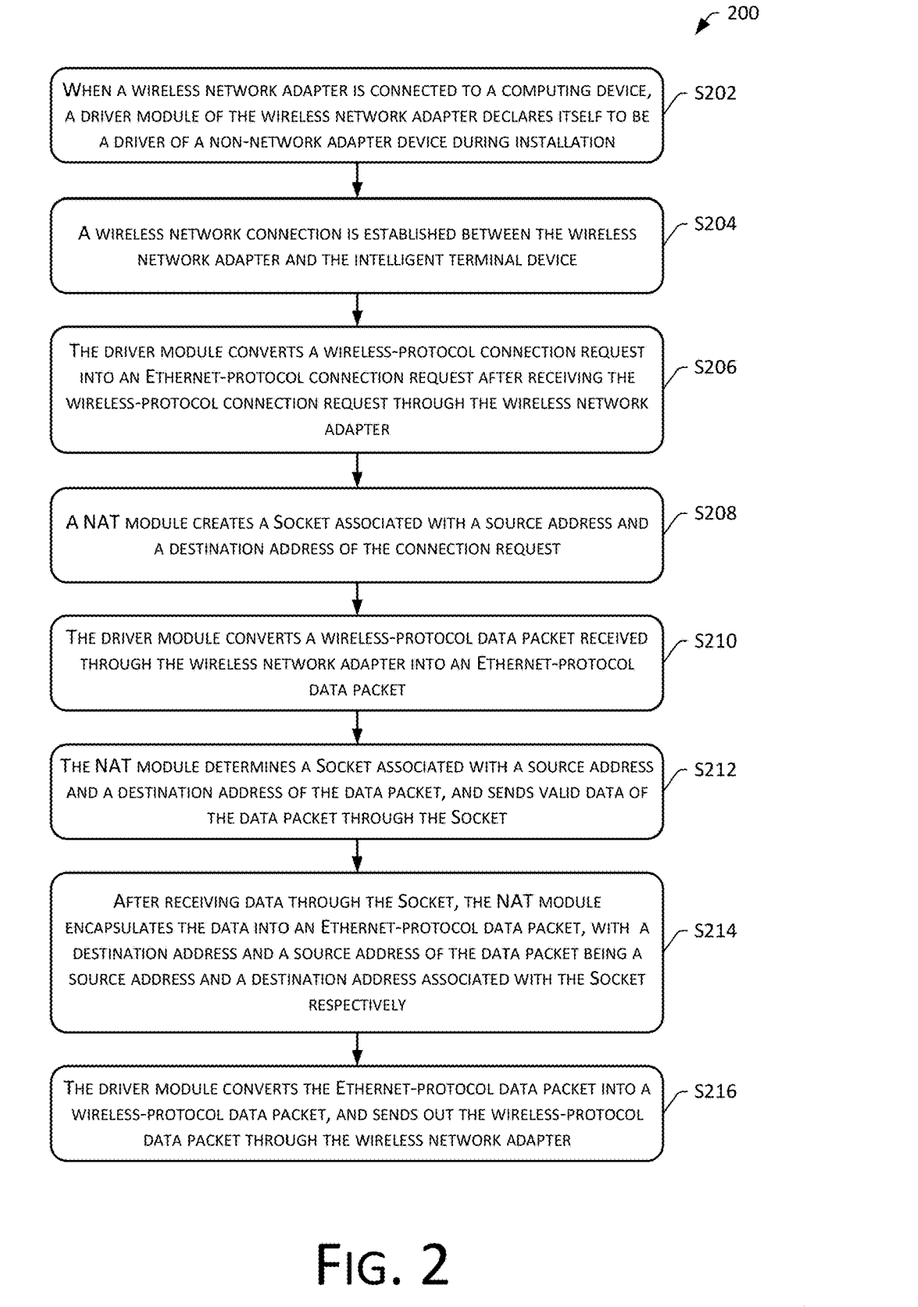
FIG. 2 is a flowchart of an implementation method according to an embodiment of the present disclosure.

FIG. 2 is a flowchart of an implementation method 200 according to an embodiment of the present disclosure. As shown in FIG. 2, the method 200 may include the following procedure.

At S202, when a wireless network adapter is connected to a computing device, a driver module of the wireless network adapter declares itself to be a driver of a non-network adapter device during installation.

In implementations, the wireless network adapter, as a hardware component, needs to be connected to a computing device, to implement network sharing using the computing device as a hotspot. A wireless network adapter and a connection between the wireless network adapter and a computing device may come in various different forms. For example, the wireless network adapter may be in a form of a USB device, and the wireless network adapter may be connected to the computing device in a plug and play manner. After the wireless network adapter is plugged into the computing device, a driver of the wireless network adapter needs to be installed. A driver stored in a hardware storage space may be automatically recognized, read, and installed. Alternatively, a user may manually operate the computing device to install the driver of the wireless network adapter. In implementations, the computing device is capable of accessing a network or the Internet, for example, through a wired or wireless connection or coupling.

In implementations, during installation of the driver of the wireless network adapter, the driver module may declare itself to be a network adapter driver, or may declare itself to be not a network adapter driver. The latter is preferable. The driver module declares itself to be not a network adapter driver, that is, the driver module may declare itself to be a driver of any type other than the network adapter driver, for example, a video card driver, a mouse driver, etc.

Generally, all hardware components that process network data packets are declared to be a network adapter type in a Windows system, which process data with the help of existing protocol stacks and transfer services of an operating system. Once declared to be a network adapter type, if a network environment where a wireless network adapter is located limits the number of network adapters sharing a network (for example, a single account allows only one network adapter to use the network at the same time), the wireless network adapter connected to a computing device may be detected by a network adapter detection mechanism and thus be prevented from being used. In the present disclosure, when a wireless network adapter used for network sharing is connected to the computing device, a driver of the wireless network adapter may declare itself to be a driver of a non-network adapter device, e.g., a driver of a mouse, a keyboard, a camera, a video card, or other device, during installation. In this way, an operating system considers the driver as a non-network adapter driver. A common network adapter detection mechanism cannot detect the wireless network adapter, and an approach of limiting network sharing activities of users based on network adapters cannot produce any effects.

During the installation of the driver, the operating system reads INF (device information file) provided by the driver, for example:

[Version]
Signature="$Windows NT$"
Class=Sample
ClassGuid={78A1C341-4539-11d3-B88D-00C04FAD5171}

The line Class=Sample indicates a type of a current device. If declared to be a network adapter, the line may be Class=Net.

However, once the driver declares itself to be a network adapter driver, the operating system may query the network adapter according to a network adapter standard, for information such as a speed of the network adapter and a MAC address of the network adapter, etc. Once installed, the network adapter will be monitored by software such as a network firewall and anti-virus software in the operating system, causing extremely large operation overheads. Furthermore, once a problem exists in any processing of these software components, all software components on the entire link becomes abnormal, and operations of the network adapter would also be affected because this part of data is processed in serial.

In implementations, when the driver is declared to be a non-network adapter driver, a number of types may be set for the Class, e.g., Class=Bluetooth for Bluetooth, Class=Image for a camera, etc.

After the driver is installed, an AP (hotspot) function of the driver module may be enabled by default, or may be enabled after a control command is received. After the AP function is enabled, an intelligent terminal device may establish a wireless connection to the wireless network adapter within a wireless communication range of the wireless network adapter. Specifically, at S204, a wireless network connection is established between the wireless network adapter and the intelligent terminal device. A process of establishing a wireless network connection may be implemented using an existing method, which is not described in detail herein.

When the intelligent terminal device needs to use the computing device as a hotspot to access a network through the computing device, a network connection with a device to be accessed (such as a server of a service provider) in an external network needs to be established. Therefore, the intelligent terminal device may send a wireless-protocol connection request through the wireless network connection with the wireless network adapter. A source address of the connection request is an IP address of the intelligent terminal device, and a destination address is an IP address of the device to be accessed.

At S206, the driver module converts a wireless-protocol connection request into an Ethernet-protocol connection request after receiving the wireless-protocol connection request through the wireless network adapter.

In implementations, 802.11 may be employed for a wireless protocol, and 802.3 may be employed for an Ethernet protocol, for example. Accordingly, a connection request of the 802.11 wireless protocol is converted into a connection request of the 802.3 Ethernet protocol at this operation (i.e., S206).

At S208, a NAT module creates a Socket associated with a source address and a destination address of the connection request.

This operation (i.e., S208) may be performed by the driver of the wireless network adapter or by an upper-layer application. The upper-layer application may be an application module in the computing device. When an operating system such as Windows communicates with the wireless network adapter, the operating system may create an application module (i.e., a process), and load the driver of the wireless network adapter into the application module. The application module may be implemented by using a WUDFHost process or the like.

When acquiring a connection request from the driver module through a file read/write interface, the NAT module parses the connection request to obtain a source address and a destination address, and creates a Socket for the connection request. An IP address of the Socket is an IP address of the computing device, and a port number is a newly allocated port number. After the Socket is created, an association relationship among the Socket, the source address and the destination address is maintained.

The created Socket is used for establishing a network connection between the computing device and a device corresponding to the destination address of the connection request. A network protocol driver (such as a TCP/IP protocol driver) in the computing device completes the establishment of the network connection with the device corresponding to the destination address by using the created Socket. In other words, the network connection exposes the IP address and the port number of the computing device to the device corresponding to the destination address of the connection request, and hides an actual requestor (the intelligent terminal device).

For a connection response returned from an external network, the network protocol driver in the computing device may take off a protocol header of the connection response and then send the connection response to the Socket. The NAT module encapsulates the connection response that is received through the Socket into an Ethernet-protocol connection response. A destination address of the connection response is a source address associated with the Socket, and a source address of the connection response is a destination address associated with the Socket. The driver module converts the connection response into a wireless-protocol connection response and sends the connection response to the intelligent terminal device through the wireless network adapter.

Once the network connection is established, the intelligent terminal device may start to conduct data transmission with the device to be accessed via the computing device, i.e., the following operation is performed.

At S210, the driver module converts a wireless-protocol data packet received through the wireless network adapter into an Ethernet-protocol data packet.

The intelligent terminal device sends a data packet to the wireless network adapter. A source IP address and a destination address of the data packet are an IP address of the intelligent terminal device and an IP address of the device to be accessed respectively. This operation may be performed by the driver module. After receiving the data packet through the wireless network adapter, the driver module performs a conversion from the wireless protocol to the Ethernet protocol.

At S212, the NAT module determines a Socket associated with a source address and a destination address of the data packet, and sends valid data of the data packet through the Socket.

After acquiring the data packet from the driver module through the file read/write interface, the NAT module can find a Socket associated with a source address and a destination address of the data packet through the previously maintained association relationship among the source address, the destination address and the Socket. Then, a protocol header of the Ethernet-protocol data packet is taken off, and valid data therein is sent through the Socket.

After encapsulating the valid data using information (IP address and port number) of the Socket, the network protocol driver in the computing device sends an encapsulated data packet through the previously established network connection between the computing device and the device to be accessed. A source address of the encapsulated data packet is the IP address of the computing device. After receiving the data packet, the device to be accessed may return a response data packet to the computing device, and the network protocol driver in the computing device sends valid data in the response data packet to the corresponding Socket.

At S214, after receiving data through the Socket, the NAT module encapsulates the data into an Ethernet-protocol data packet, with a destination address and a source address of the data packet being a source address and a destination address associated with the Socket respectively.

After receiving data through the Socket, the NAT module determines a source address and a destination address associated with the Socket. The source address and the destination address are the IP address of the intelligent terminal device and the IP address of the device to be accessed. When encapsulating an Ethernet-protocol data packet, the NAT module uses the IP address to be accessed as the source address of the data packet, and uses the IP address of the intelligent terminal device as the destination address of the data packet.

At S216, the driver module converts the Ethernet-protocol data packet into a wireless-protocol data packet, and sends out the wireless-protocol data packet through the wireless network adapter.

After converting the Ethernet-protocol data packet into a wireless-protocol data packet through the file read/write interface, the driver module sends the wireless-protocol data packet to the intelligent terminal device through the wireless network adapter.

Figure 3:
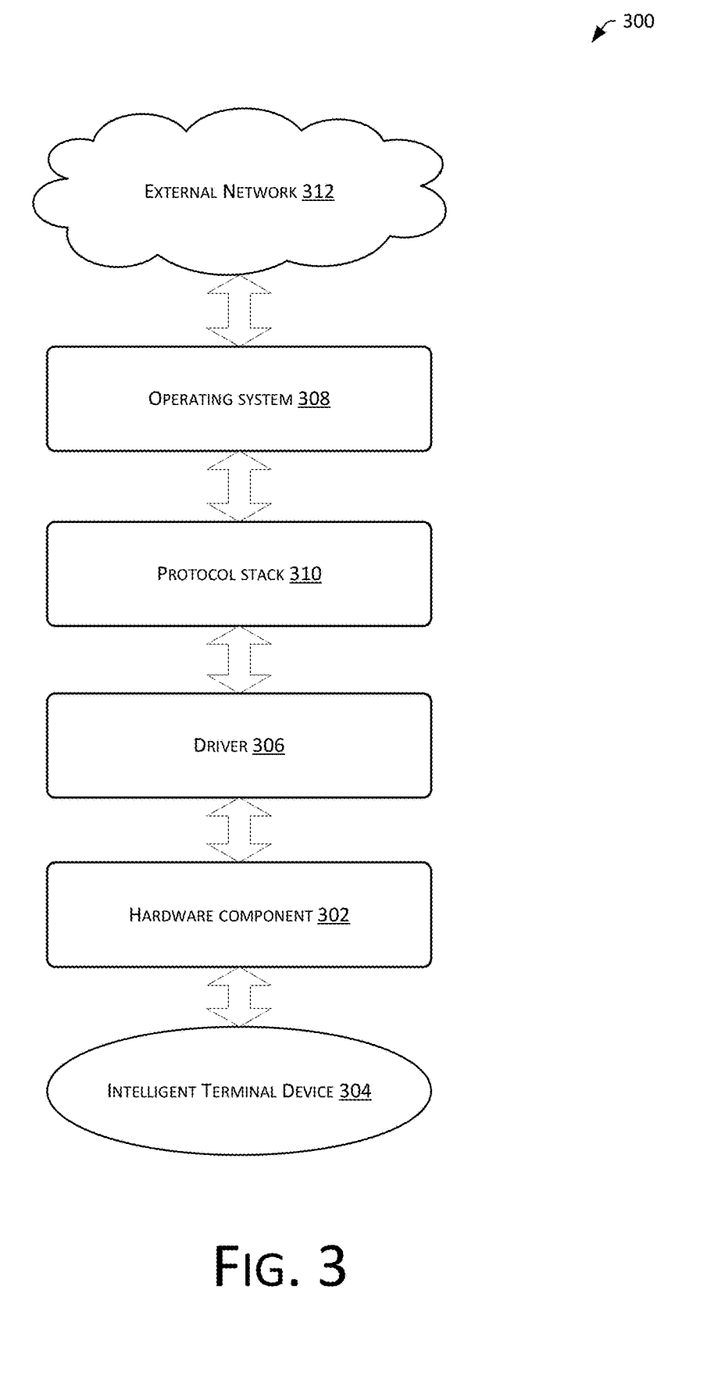
FIG. 3 is a schematic diagram of a framework according to an embodiment of the present disclosure.

As can be seen from the foregoing process, this embodiment of the present disclosure is based on the framework 300 as shown in FIG. 3. A hardware component 302 of a wireless network adapter serves as a physical entity connected to a computing device and an interface for sending/receiving data packets to/from an intelligent terminal device 304. A driver 306, which acts as a small piece of code added to an operating system 308, includes information related to the hardware component 302, so that a computer can communicate with this hardware component 302. A protocol stack 310 in this embodiment of the present disclosure is a sum of protocols at all layers, and reflects a process of transmitting a data packet in this embodiment of the present disclosure. The operating system 308 is responsible for completing an establishment of a connection and a transmission of data packets between the computing device and an external network 312.

Figure 4:
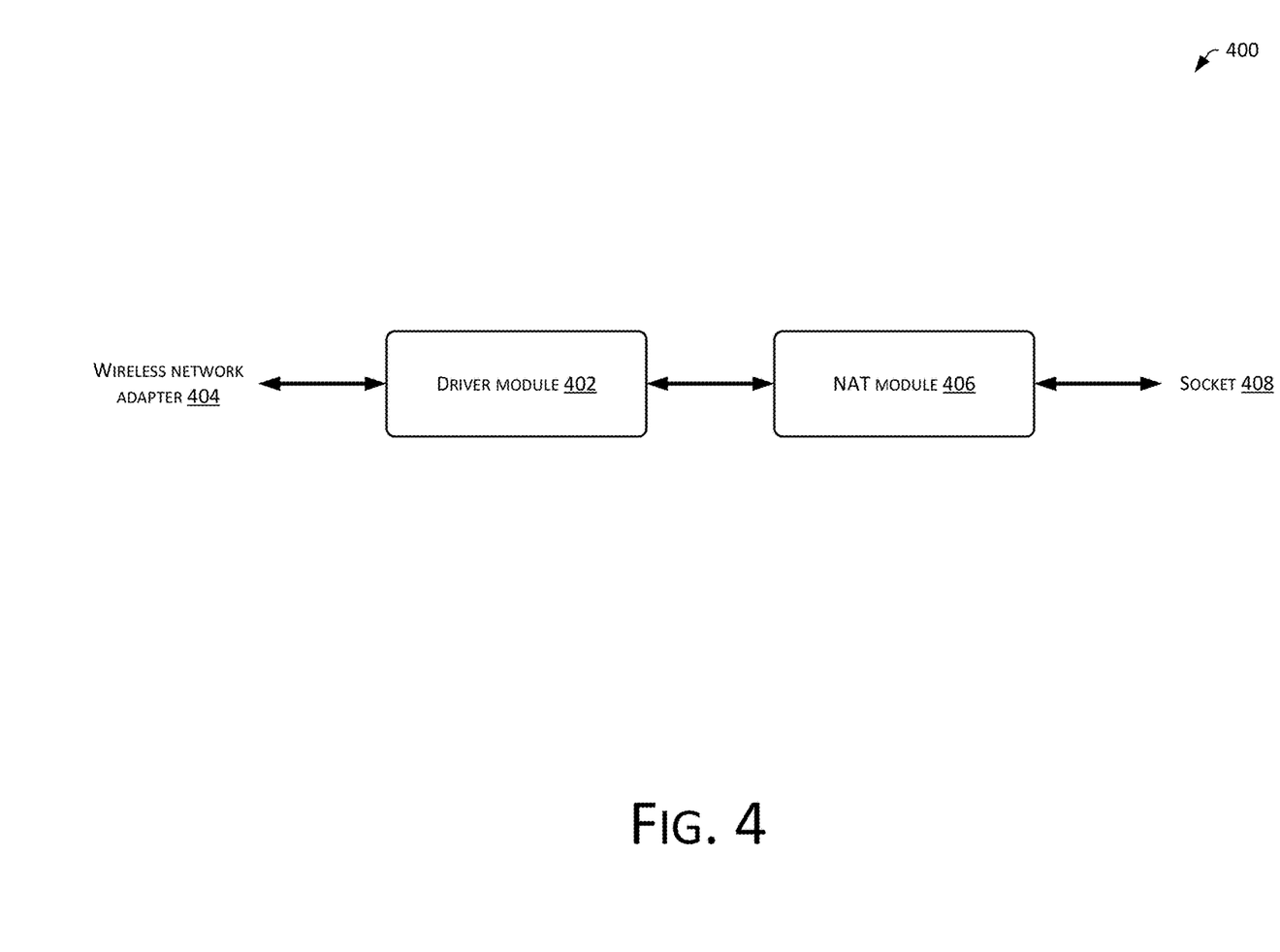
FIG. 4 is a structural diagram of an apparatus according to an embodiment of the present disclosure.

The method provided in the present disclosure is described in detail above, and the apparatus provided in the present disclosure is described in detail below. FIG. 4 is a structural diagram of an apparatus 400 according to an embodiment of the present disclosure. As shown in FIG. 4, the apparatus 400 may include a driver module 402 of a wireless network adapter 404 and a NAT module 406. The wireless network adapter 404, which is a hardware component, may include one or more processing units, an input/output interface, a network interface, and memory (such as a processor-readable media, for example). In implementations, the wireless network adapter 404 may be connected to a computing device. The wireless network adapter 404 and a connection between the wireless network adapter 404 and the computing device may be taken in various forms. In implementations, the wireless network adapter 404 may be in a form of a USB device, and the wireless network adapter 404 is connected to the computing device in a plug and play manner. When the wireless network adapter 404 is connected to the computing device, the driver module 402 may declare itself to be a network adapter driver, or may declare itself to be a non-network adapter device during installation, with the latter being preferable. The driver module 402 may declare itself to be a driver of a device such as a mouse, a keyboard, a camera, a video card, or the like. In this way, an operating system considers that the driver 402 is not a network adapter driver, and a common network adapter detection mechanism cannot detect the wireless network adapter 404. Furthermore, the approach of limiting network sharing behaviors of users based on a network adapter will not produce any effects.

The driver module 402 first establishes a wireless network connection between the wireless network adapter 404 and an intelligent mobile terminal, receives a wireless-protocol connection request and a data packet from the intelligent mobile terminal via the wireless network adapter 404, and sends a wireless-protocol data packet to the intelligent mobile terminal via the wireless network adapter 404.

When the intelligent terminal device needs to use the computing device as a hotspot to access a network through the computing device, a network connection with a device to be accessed needs to be established. Therefore, the intelligent terminal device may send a wireless-protocol connection request through the wireless network connection with the wireless network adapter 404. In this case, the driver module 402 converts the wireless-protocol connection request received through the wireless network adapter 404 into an Ethernet-protocol connection request, and provides the converted connection request to the NAT module 406.

When acquiring the connection request from the driver module 402 through a file read/write interface, the NAT module 406 creates a Socket 408 associated with a source address and a destination address of the connection request provided by the driver module 402. An IP address of the Socket 408 is an IP address of the computing device, and a port number is a newly allocated port number. The created Socket 408 is used for establishing a network connection between the computing device and a device corresponding to the destination address of the connection request. A network protocol driver (such as a TCP/IP protocol driver) in the computing device completes the establishment of the network connection to the device corresponding to the destination address by using the created Socket 408. In other words, the network connection exposes the IP address and the port number of the computing device to the device corresponding to the destination address of the connection request, and hides an actual requestor (the intelligent terminal device).

For a connection response returned from an external network, the network protocol driver in the computing device may send the connection response to the Socket 408 after removing a protocol header from the connection response. The NAT module 406 encapsulates the connection response received through the Socket 408 into an Ethernet-protocol connection response, where a destination address and a source address of the connection response are a source address and a destination address associated with the Socket 408 respectively. The encapsulated connection response is sent to the driver module 402. The driver module 402 converts the connection response into a wireless-protocol connection response and sends the connection response to the intelligent terminal device through the wireless network adapter 404.

In a process of implementing a device hotspot using the apparatus 400, for a data packet sent by an intelligent terminal device to a device to be accessed (a device in an external network), the driver module 402 may convert a wireless-protocol data packet received through the wireless network adapter 404 into an Ethernet-protocol data packet, and provide the converted data packet to the NAT module 406. After acquiring the data packet from the driver module 402 through a file read/write interface, the NAT module 406 determines a Socket (e.g., Socket 408) associated with a source address and a destination address of the data packet provided by the driver module 402, and sends valid data of the data packet through the Socket 408.

After encapsulating the valid data using information (IP address and port number) of the Socket 408, a network protocol driver in a computing device sends an encapsulated data packet through a previously established network connection between the computing device and the device to be accessed. A source address of the encapsulated data packet is the IP address of the computing device. After receiving the data packet, the device to be accessed may return a response data packet to the computing device, and the network protocol driver in the computing device sends valid data that is included in the response data packet to the corresponding Socket 408.

After receiving the data through the Socket 408, the NAT module 406 encapsulates the data into an Ethernet-protocol data packet, and provides the encapsulated data packet to the driver module 402, where a destination address of the data packet is a source address associated with the Socket 408, and a source address of the data packet is a destination address associated with the Socket 408. The driver module 402 converts the data packet provided by the NAT module 406 into a wireless-protocol data packet, and sends the wireless-protocol data packet to the intelligent terminal device through the wireless network adapter 404.

The foregoing NAT module 406 may be deployed in the driver module 402, i.e., both the NAT module 406 and the driver module 402 are drivers of the wireless network adapter 404, or the NAT module 406 may be deployed in an upper-layer application.

Figure 5:
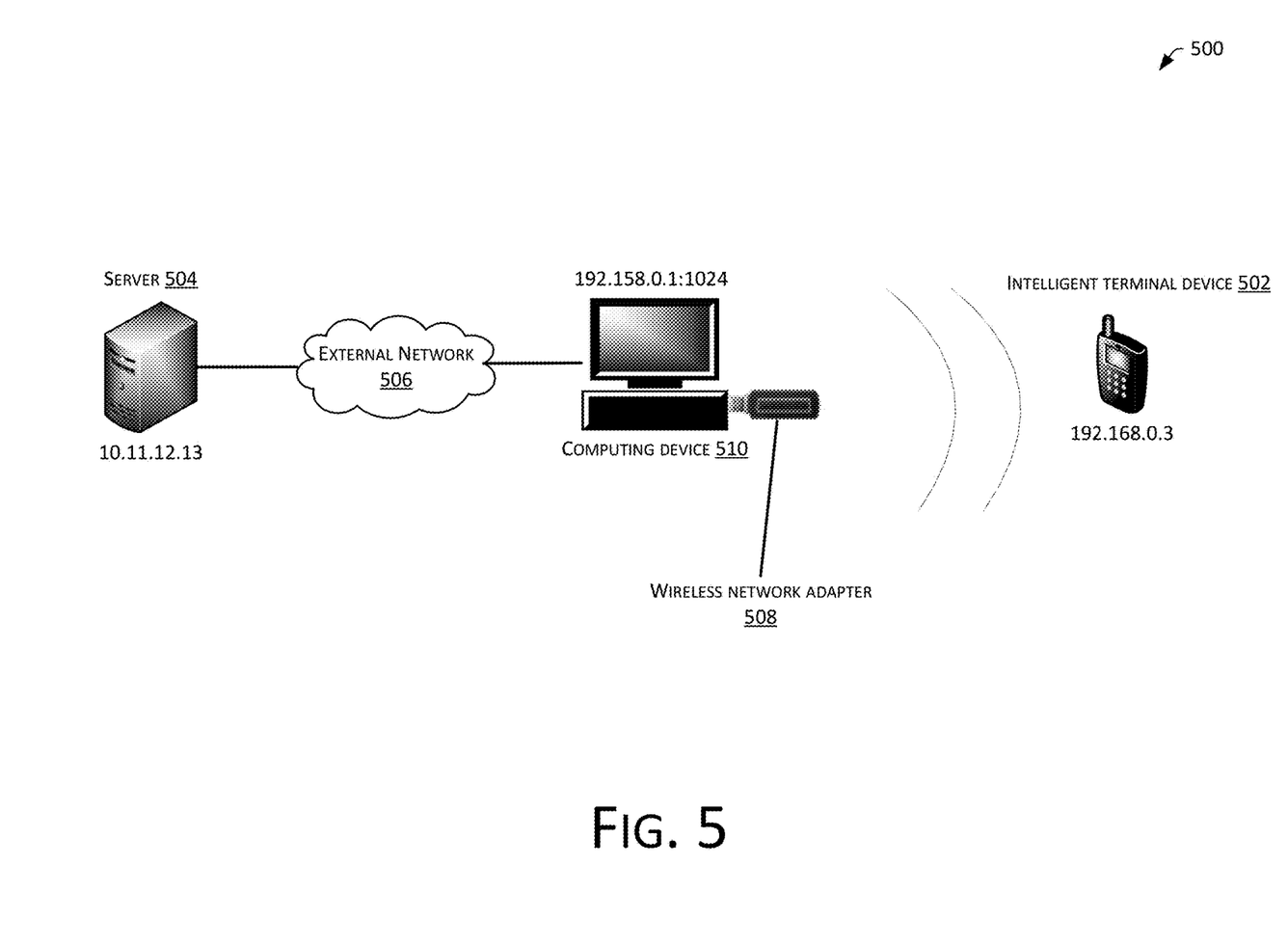
FIG. 5 is a diagram of an instance for implementing a device hotspot according to an embodiment of the present disclosure.

An example 500 is provided as follows. When an intelligent terminal device 502 having an IP address as 192.168.0.3 needs to access a server 504 having an IP address as 10.11.12.13 in an external network 506 through a device hotspot as shown in FIG. 5, for example, a USB-form wireless network adapter 508 is first plugged into a computing device 510. The wireless network adapter 508 is similar to a USB drive. After being plugged into the computing device 510, a driver in a storage space of the wireless network adapter 508 is automatically recognized and installed. During installation, the driver declares itself to be a driver of a non-network adapter device. After the installation is completed, an AP function is enabled by default. The intelligent terminal device 502 finds an identifier of the wireless network adapter 508, and then establishes a wifi connection to the wireless network adapter.

When needing to access the server 504, the intelligent terminal device 502 sends out a connection request with a source address and a destination address being 192.168.0.3 and 10.11.12.13 respectively. In response to receiving the connection request through the wireless network adapter 508, a driver module converts the wireless-protocol connection request into an Ethernet-protocol connection request. After acquiring the connection request through a file read/write interface, an application module creates a Socket that is associated with the source address (i.e., 192.168.0.3) and the destination address (i.e., 10.11.12.13). An IP address of the Socket is an IP address of the computing device (which is assumed to be 192.158.0.1), and a port number is 1024. A TCP/IP protocol driver in the computing device then establishes a network connection to the server 504 which has the IP address as 10.11.12.13 using the Socket. From the perspective of the server 504, the opposite device is the computing device 510, i.e., what are exposed to the server 504 are the IP address and the port number of the computing device 510, with the intelligent terminal device 502 being hidden therefrom.

The intelligent terminal device 502 sends a data packet having a source IP address and destination address being 192.168.0.3 and 10.11.12.13 respectively. After receiving the data packet through the wireless network adapter 508, the driver module converts the data packet from a wifi protocol into an Ethernet protocol. The application module determines a Socket associated with the source address and the destination address of the data packet, and sends valid data of the data packet through the Socket. The TCP/IP protocol driver in the computing device 510 encapsulates the valid data using the IP address and the port number of the Socket, and sends the encapsulated data packet to the server 504. The encapsulated data packet has a source IP address of 192.158.0.1, a port number of 1024, and a destination IP address of 10.11.12.13.

For a response data packet returned by the server 504, the TCP/IP protocol driver in the computing device 510 may send valid data therein to the application module through the Socket. The application module encapsulates the data into an Ethernet-protocol data packet, where a source address of the data packet is the destination address associated with the Socket (i.e., 10.11.12.13), and a destination address is the source address associated with the Socket (i.e., 192.168.0.3). The application module then sends the encapsulated data packet to the driver module. The driver module converts the Ethernet-protocol data packet into a wifi-protocol data packet, and sends the data packet to the intelligent terminal device 502 through the wireless network adapter 508.

In addition, in this embodiment of the present disclosure, if a network bandwidth type used by a computing device does not limit the number of network adapters (e.g., the bandwidth used by most family types does not limit the number of terminals accessed to the same account), a wireless network adapter may declare itself to be a network adapter device during installation of a driver of the wireless network adapter, after the wireless network adapter is connected to the computing device.

However, in some cases, a network bandwidth type used by a computing device limits the number of network adapters. For example, schools may limit network sharing of students, and a single account can only be used on one device in some network environments of the campuses. For example, the account cannot be used on a mobile phone if being used on a computing device. Moreover, client terminals with strict monitoring measures are generally installed in schools, and once multiple network adapters are detected on a computing device, a network service will be disabled. In these cases, after the wireless network adapter in this embodiment of the present disclosure is connected to the computing device, the wireless network adapter may declare itself to be a non-network adapter device during installation of a driver of the wireless network adapter, and the client terminals cannot detect the network sharing behavior.

As can be seen from the above description, the method and apparatus provided in the present disclosure have the following advantages:

1) The present disclosure realizes a device hotspot by allowing a driver module of a wireless network adapter and a NAT module rather than an operating system to process data packets, and therefore, the device hotspot is no longer limited by a framework of the operating system.

2) In addition, since a driver may declare that a hardware component is not a network adapter, a situation in which a protocol driver of a Windows system considers that the network adapter is faulty and disrupts a network connection does not occur during an installation of the driver. Moreover, all limitations on network sharing behaviors that are based on network adaptor detection mechanism are ineffective.

3) In the present disclosure, the driver directly operates hardware. Specifically, interactions with hardware of the wireless network adapter (which is performed by an operating system in existing technologies) are directly performed by the driver of the wireless network adapter. This bypasses the operating system, and operations are in a user mode rather than a kernel mode (i.e., a process executes a user code rather than a kernel code of the operating system). As such, the problem of system compatibility no longer exists. Even if the driver program itself has a BUG and leads to a breakdown, no problem occurs in the operating system, thus avoiding the blue screen that results in a crash of the computing device, and minimizing risks of users.

In the multiple embodiments provided in the present disclosure, it should be understood that the disclosed apparatus and method may be implemented in other manners. For example, the apparatus embodiment described above is merely exemplary. The foregoing division of the units is merely a division of logic functions, for example, and other manners of division can exist during actual implementation.

The units described as separate components may or may not be physically separate. A component displayed as a unit may or may not be a physical unit, i.e., may be located at a single place, or distributed among multiple network units. Some or all of the units may be selected according to an actual requirement, to achieve the objective of the solutions of the embodiments.

In addition, the functional units in the embodiments of the present disclosure may be integrated in a single processing unit. Alternatively, each unit may physically and individually exist. Alternatively, two or more units may be integrated in a single unit. The foregoing integrated unit may be implemented in a form of hardware component(s), or implemented in a form of hardware component(s) plus software functional unit(s).

The integrated unit implemented in a form of software functional unit(s) may be stored in a processor-readable media. The software functional unit(s) may be stored in a readable media, and may include instructions to cause a computing device (which may be a personal computer, a server, or a network device), processor(s) or processing unit(s) to execute some operations of the method in each embodiment of the present disclosure. The foregoing readable media includes various types of media that are capable of storing program codes, such as a USB drive, a mobile hard disk drive, a Read-Only Memory (ROM), a Random Access Memory (RAM), a magnetic disk, or an optical disc, etc.

In implementations, the processor-readable media may include a volatile or non-volatile type, a removable or non-removable media, which may achieve storage of information using any method or technology. The information may include a processor-readable instruction, a data structure, a program module or other data. Examples of processor-readable media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device, a processor, and/or a processing unit, etc. As defined herein, the processor-readable media does not include transitory media, such as modulated data signals and carrier waves.

The above are merely exemplary embodiments of the present disclosure, which are not intended to limit the present disclosure. Any modifications, equivalent replacements, improvements, or the like made within the spirit and principle of the present disclosure should be included in the scope of protection of the present disclosure.

What is claimed is:

1. A method comprising:
    converting, by a driver module of the wireless network adapter, a wireless-protocol data packet received through the wireless network adapter into an Ethernet-protocol data packet, wherein the driver module declares to be a non-network adapter driver during installation; and
    determining, by a network address translation (NAT) module, a Socket associated with a source address and a destination address of the Ethernet-protocol data packet, and sending, by the NAT module, valid data of the Ethernet-protocol data packet through the Socket.

2. The method of claim 1, further comprising:
    encapsulating, by the NAT module, data into the Ethernet-protocol data packet after receiving the data through the Socket, wherein a destination address of the data packet is the source address associated with the Socket, and a source address of the data packet is the destination address associated with the Socket; and
    converting, by the driver module, the data packet into the wireless-protocol data packet, and sending, by the driver module, the wireless-protocol data packet through the wireless network adapter.

3. The method of claim 1, further comprising pre-establishing, by the wireless network adapter, a wireless network connection to a mobile terminal, wherein the wireless-protocol data packet received through the wireless network adapter comes from the mobile terminal, and the wireless-protocol data packet sent through the wireless network adapter is sent to the mobile terminal.

4. The method of claim 1, further comprising:
converting, by the driver module, a wireless-protocol connection request received through the wireless network adapter into an Ethernet-protocol connection request;
creating, by the NAT module, a Socket associated with a source address and a destination address of the connection request, the created Socket being used for establishing a network connection between the computing device and a device corresponding to the destination address of the connection request;
encapsulating, by the NAT module, a connection response received through the created Socket into an Ethernet-protocol connection response, a destination address and a source address of the connection response being a source address and a destination address associated with the created Socket;
converting, by the driver module, the connection response into a wireless-protocol connection response; and
sending, by the driver module, the connection response through the wireless network adapter.

5. The method of claim 1, wherein sending the valid data of the Ethernet-protocol data packet through the Socket comprises:
sending the valid data of the Ethernet-protocol data packet to a network protocol driver in the computing device through the Socket, to facilitate the network protocol driver in the computing device to send an encapsulated data packet through the network connection after encapsulating the valid data using information of the Socket.

6. The method of claim 1, wherein the NAT module is deployed in the driver module or deployed in an upper-layer application.

7. An apparatus comprising:
a wireless network adapter including a processing unit, memory, a driver module and a network address translation (NAT) module that are stored in the memory and executable by the processing unit, wherein:
the driver module is configured to convert a wireless-protocol data packet that is received through the wireless network adapter into an Ethernet-protocol data packet, and provide the converted data packet to the NAT module, wherein the driver module declares to be a non-network adapter driver during installation when the wireless network adapter is connected to a computing device; and
the NAT module is configured to determine a Socket associated with a source address and a destination address of the converted data packet provided by the driver module, and send valid data of the converted data packet through the Socket.

8. The apparatus of claim 7, wherein the NAT module is further configured to encapsulate the data into the Ethernet-protocol data packet after receiving the data through the Socket, and provide the encapsulated data packet to the driver module, wherein a destination address and a source address of the data packet are the source address and the destination address associated with the Socket respectively, and the driver module is further configured to convert the data packet provided by the NAT module into the wireless-protocol data packet and send the data packet through the wireless network adapter.

9. The apparatus of claim 8, wherein the driver module is further configured to pre-establish a wireless network connection between the wireless network adapter and a mobile terminal, receive the wireless-protocol data packet from the mobile terminal through the wireless network adapter, and send the wireless-protocol data packet to the mobile terminal through the wireless network adapter.

10. The apparatus of claim 7, wherein the driver module is further configured to convert a wireless-protocol connection request received through the wireless network adapter into an Ethernet-protocol connection request, and provide the converted connection request to the NAT module, convert a connection response provided by the NAT module into a wireless-protocol connection response, and send the connection response through the wireless network adapter; and
the NAT module is further configured to create a Socket associated with a source address and a destination address of the connection request provided by the driver module, the created Socket being used for establishing a network connection between the computing device and a device corresponding to the destination address of the connection request, encapsulate the connection response received through the Socket into an Ethernet-protocol connection response, wherein a destination address of the connection response is a source address associated with the Socket, and a source address of the connection response is a destination address associated with the Socket; and provide the encapsulated connection response to the driver module.

11. The apparatus of claim 7, wherein the valid data is sent to a network protocol driver in the computing device when the NAT module sends the valid data of the data packet through the Socket, so that the network protocol driver in the computing device sends an encapsulated data packet through a network connection after encapsulating the valid data using information of the Socket.

12. The apparatus of claim 7, wherein the NAT module is deployed in the driver module or deployed in an upper-layer application.

13. A wireless network adapter comprising:
memory;
a processing unit;
a driver module stored in the memory and executable by the processing unit to convert a wireless-protocol data packet received through the wireless network adapter into an Ethernet-protocol data packet, wherein the driver module declares to be a non-network adapter driver during installation; and
a network address translation (NAT) module stored in the memory and executable by the processing unit to determine a Socket associated with a source address and a destination address of the Ethernet-protocol data packet, and send valid data of the Ethernet-protocol data packet through the Socket.

14. The wireless network adapter of claim 13, wherein:
the NAT module is further configured to encapsulate data into the Ethernet-protocol data packet after receiving the data through the Socket, wherein a destination address of the data packet is the source address associated with the Socket, and a source address of the data packet is the destination address associated with the Socket, and
the driver module is further configured to convert the data packet into the wireless-protocol data packet, and sends the wireless-protocol data packet through the wireless network adapter.

15. The wireless network adapter of claim 13, wherein the wireless network adapter is further configured to pre-establish a wireless network connection to a mobile terminal, wherein the wireless-protocol data packet received through the wireless network adapter comes from the mobile terminal, and the wireless-protocol data packet sent through the wireless network adapter is sent to the mobile terminal.

16. The wireless network adapter of claim 13, wherein:
the driver module is further configured to convert a wireless-protocol connection request received through the wireless network adapter into an Ethernet-protocol connection request;
the NAT module is further configured to create a Socket associated with a source address and a destination address of the connection request, and establish a connection response received through the created Socket into an Ethernet-protocol connection response, wherein the created Socket is used for establishing a network connection between the computing device and a device corresponding to the destination address of the connection request, and a destination address and a source address of the connection response are a source address and a destination address associated with the created Socket respectively; and
the driver module is further configured to convert the connection response into a wireless-protocol connection response, and send the connection response through the wireless network adapter.

17. The wireless network adapter of claim 13, wherein sending the valid data of the Ethernet-protocol data packet through the Socket comprises sending the valid data of the Ethernet-protocol data packet to a network protocol driver in the computing device through the Socket, to facilitate the network protocol driver in the computing device to send an encapsulated data packet through the network connection after encapsulating the valid data using information of the Socket.

\* \* \* \* \*